United States Patent
Fevrier et al.

(10) Patent No.: US 6,751,371 B1
(45) Date of Patent: Jun. 15, 2004

(54) METHOD AND APPARATUS FOR OPTICAL ELEMENT MANAGEMENT

(75) Inventors: Herve A. Fevrier, Plano, TX (US); Paul D. Pantages, McKinney, TX (US); Michel W. Chbat, Allen, TX (US); Anand K. Gonuguntla, Richardson, TX (US); Zhi Feng, Plano, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 10/007,086

(22) Filed: Dec. 6, 2001

(51) Int. Cl.[7] .............................. G02B 6/28; G02B 6/26; G06F 19/00

(52) U.S. Cl. ......................... 385/24; 385/15; 700/108

(58) Field of Search ............................. 700/108; 385/15, 385/24

(56) References Cited

U.S. PATENT DOCUMENTS

| | | | | |
|---|---|---|---|---|
| 4,700,339 A | | 10/1987 | Gordon et al. ................. 370/3 |
| 4,858,102 A | * | 8/1989 | Lovrenich ....................... 700/7 |
| 4,932,739 A | | 6/1990 | Islam ...................... 350/96.15 |
| 4,995,690 A | | 2/1991 | Islam ...................... 350/96.15 |
| 5,020,050 A | | 5/1991 | Islam ............................. 370/4 |
| 5,078,464 A | | 1/1992 | Islam ......................... 385/122 |
| 5,101,456 A | | 3/1992 | Islam ........................... 385/27 |
| 5,115,488 A | | 5/1992 | Islam et al. ................. 385/129 |
| 5,224,194 A | | 6/1993 | Islam ......................... 385/122 |
| 5,369,519 A | | 11/1994 | Islam ......................... 359/173 |
| 5,485,536 A | | 1/1996 | Islam ........................... 385/31 |
| 5,664,036 A | | 9/1997 | Islam ........................... 385/31 |
| 5,778,014 A | | 7/1998 | Islam ............................. 372/6 |
| 5,796,909 A | | 8/1998 | Islam ......................... 385/147 |
| 6,043,927 A | | 3/2000 | Islam ......................... 359/332 |
| 6,052,393 A | | 4/2000 | Islam ............................. 372/6 |
| 6,078,877 A | * | 6/2000 | Fujii et al. ................... 702/188 |
| 6,101,024 A | | 8/2000 | Islam et al. ................. 359/334 |
| 6,229,937 B1 | | 5/2001 | Nolan et al. ................... 385/24 |
| 6,239,902 B1 | | 5/2001 | Islam et al. ................. 359/334 |
| 6,239,903 B1 | | 5/2001 | Islam et al. ................. 359/337 |
| 6,301,514 B1 | * | 10/2001 | Canada et al. ............... 700/108 |
| 6,335,820 B1 | * | 1/2002 | Islam ......................... 359/334 |
| 6,356,384 B1 | * | 3/2002 | Islam ......................... 359/334 |
| 6,359,725 B1 | * | 3/2002 | Islam ......................... 359/334 |
| 6,370,164 B1 | * | 4/2002 | Islam ............................. 372/6 |
| 6,374,006 B1 | * | 4/2002 | Islam et al. ................... 385/15 |
| 6,381,391 B1 | * | 4/2002 | Islam et al. ................. 385/123 |
| 6,563,614 B1 | * | 5/2003 | Stephens et al. ............... 398/5 |
| 2002/0186460 A1 | * | 12/2002 | Lelic ....................... 359/341.4 |
| 2003/0021011 A1 | * | 1/2003 | Huang et al. ............ 359/337.1 |
| 2003/0039015 A1 | * | 2/2003 | Vujkovic-Cvijin et al. . 359/187 |
| 2003/0048500 A1 | * | 3/2003 | Fala et al. ................... 359/110 |
| 2003/0086140 A1 | * | 5/2003 | Thomas et al. ............. 359/167 |
| 2003/0090783 A1 | * | 5/2003 | So ......................... 359/337.11 |
| 2003/0095736 A1 | * | 5/2003 | Kish et al. ..................... 385/14 |
| 2003/0117678 A1 | * | 6/2003 | Chang et al. ............... 359/157 |

FOREIGN PATENT DOCUMENTS

WO 00/72479 11/2000 ........... H04B/10/08

OTHER PUBLICATIONS

Optical Society of America, Optical Amplifiers and Their Applications, Technical Digest, entitled "Raman amplification and dispersion–managed solitions for all–optical, ultra–long–haul,dense WDM," with copy of slides presented at OSA, Stresa, Italy attached, Jul. 1–4, 2001.

* cited by examiner

Primary Examiner—John D. Lee
(74) Attorney, Agent, or Firm—Baker Botts L.L.P.

(57) ABSTRACT

In one aspect of the invention, a method of managing one or more optical elements includes storing in a memory, provisioning information describing at least one setting of an optical element and monitored information describing at least one operational characteristic of the optical element. At least a portion of the monitored information is correlated with at least a portion of the provisioning information. The method further includes maintaining in the memory, a correlation history comprising the provisioning information stored over time and the monitored information correlated to that provisioning information.

56 Claims, 4 Drawing Sheets

| AMP 1/LINK 1 DATE/TIME=1 | 240a PROVISIONING INFORMATION | 242a MONITORED INFORMATION |
|---|---|---|
| 250a | CHANNEL PREEMPHASIS = XX<br>NUMBER OF CHANNELS = XX | INPUT POWER = XX<br>MID-STAGE POWER = XX<br>OUTPUT POWER = XX<br>GAIN TILT = XX<br>OSNR = XX<br>BACK REFLECTED POWER = XX |

210a

○
○
○

| AMP 1/LINK=1 DATE/TIME=n | PROVISIONING INFORMATION | MONITORED INFORMATION |
|---|---|---|
| 250n | CHANNEL PREEMPHASIS = XX<br>NUMBER OF CHANNELS = XX | INPUT POWER = XX<br>MID-STAGE POWER = XX<br>OUTPUT POWER = XX<br>GAIN TILT = XX<br>OSNR = XX<br>BACK REFLECTED POWER = XX |

METHOD AND APPARATUS FOR OPTICAL ELEMENT MANAGEMENT

TECHNICAL FIELD OF THE INVENTION

The present invention relates generally to the field of optical communication systems, and more particularly to a method and apparatus for managing one or more optical elements.

BACKGROUND

Optical amplification systems are becoming increasingly complex. For example, the number of channels being amplified continues to increase as the spacing between adjacent wavelengths utilized decreases and new communication bands are implemented. Moreover, as the distance the optical signals traverse increases, the number of optical elements and spans of fiber in each optical link increases.

As the amplification systems increase in complexity, it becomes increasingly difficult to track and manage the specifics of how each element is provisioned and the operational characteristics of the elements.

OVERVIEW OF EXAMPLE EMBODIMENTS

The present invention recognizes a need for a method and apparatus operable to facilitate monitoring and/or management of the operation of one or more optical elements. Various implementations of the present invention reduce or eliminate at least some of the shortcomings of conventional element management approaches.

In one aspect of the invention, a method of managing one or more optical elements comprises storing in a memory, provisioning information describing at least one setting of an optical element and monitored information describing at least one operational characteristic of the optical element. At least a portion of the monitored information is correlated with at least a portion of the provisioning information. The method further comprises maintaining in the memory, a correlation history comprising the provisioning information stored over time and the monitored information correlated to that provisioning information.

In another aspect of the invention, a method of managing one or more optical elements comprises accessing a memory comprising monitored information describing at least one operational characteristic of an optical element measured at a plurality of time periods. The memory further comprises provisioning information correlated with at least some of the monitored information. The provisioning information describes at least one setting of the optical element. The method also comprises retrieving provisioning information correlated with monitored information reflecting a desired operational characteristic of the optical element. In addition, the method comprises applying at least a portion of the retrieved information to an application operable to monitor and/or modify the performance of the optical element based at least in part on the retrieved information.

In yet another aspect of the invention, a system operable to facilitate management of one or more optical elements comprises an element agent operable to receive provisioning information describing at least one setting of an optical element and monitoring information describing at least one operational characteristic of the optical element. At least a portion of the provisioning information is correlated with at least a portion of the monitored information. The system further comprises an element memory accessible to the element agent and operable to maintain a correlation history for the element, the correlation history comprising a plurality of correlated provisioning and monitored information measurements.

Depending on the specific features implemented, particular embodiments of the present invention may exhibit some, none, or all of the following technical advantages. For example, various embodiments of the invention facilitate maintaining a correlation history including provisioning information correlated with monitored information over a period of operation of an optical element, an optical link, or a plurality of optical links. The correlation history can facilitate various maintenance operations and/or efficiency enhancing functions with respect to the element's and/or link's operation.

For example, a graphical user interface (GUI) could display one or more sets of correlated provisioning information and monitored information to facilitate identification of trends in operation, to identify a malfunctioning component of the element, to facilitate optimization of operation, or various other utilities. As another example, the correlation history could facilitate "before and after" comparisons to assess the impact of a change in provisioning to the operation of the element and/or the link.

As still another example, the correlation history could facilitate identification of improper or inefficient provisioning settings in a particular element or link. As a related example, the correlation history could facilitate reversion provisioning. For example, the correlation history could store a set of provisioning information, which is known based, for example, on past experience to yield desired results. By indexing the correlation history using a portion of the provisioning information and one or more desired operational characteristics, the remaining provisioning information associated with the desired operating characteristics can be recalled and applied to the element and/or the link.

These are just a few examples of advantageous uses of a correlation history in an optical amplification system. Various other uses of this information fall within the spirit and scope of this invention. Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
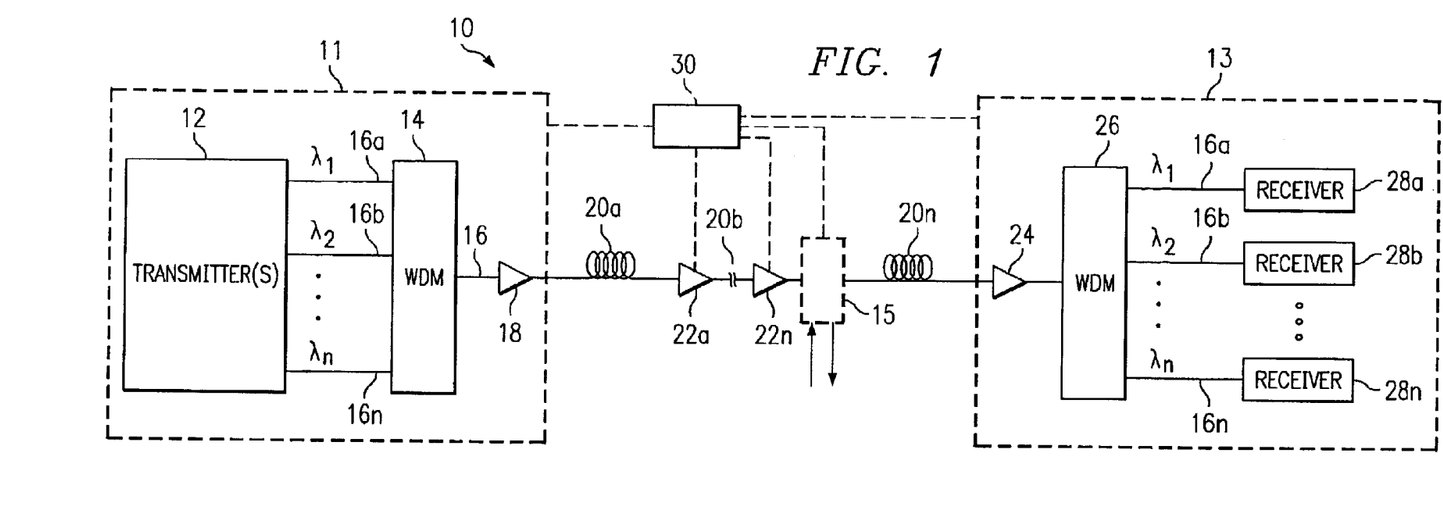
FIG. 1 is a block diagram showing an exemplary optical communication system constructed according to the teachings of the present invention.

FIG. 1 is a block diagram showing an exemplary optical communication system 10 operable to facilitate communication of one or more optical signals and to track and/or manage the operation of one or more optical elements in system 10. Optical amplifiers, optical add/drop multiplexers, cross connects, input terminals including optical transmitters, and output terminals including optical receivers provide just a few examples of optical elements that can be monitored and/or managed using system 10.

In this example, system 10 includes an input terminal 11. In the illustrated embodiment, input terminal 11 includes a transmitter bank 12 operable to generate a plurality of wavelength signals (or channels) 16a–16n. Each wavelength signal 16a–16n comprises a wavelength or range of wavelengths of light substantially different from wavelengths carried by other signals 16.

Transmitter bank 12 may include, for example, one or more optical transmitters operable to generate alone or in combination a plurality of wavelength signals 16. In one embodiment, each one of the plurality of transmitters is operable to generate one optical signal having at least one wavelength that is distinct from wavelengths generated by other transmitters 12. Alternatively, a single transmitter 12 operable to generate a plurality of wavelength signals could be implemented.

In the illustrated embodiment, input terminal 11 also includes a combiner 14 operable to receive multiple signal wavelengths 16a–16n and to combine those signal wavelengths into a single multiple wavelength signal 16. As one particular example, combiner 14 could comprise a wavelength division multiplexer (WDM). The term wavelength division multiplexer as used herein may include wavelength division multiplexers or dense wavelength division multiplexers.

In this particular example, input terminal 11 further includes a booster amplifier 18 operable to receive and amplify wavelengths of signal 16a in preparation for communication over a communication medium 20. Although this example illustrates input terminal 11 as including each of transmitter bank 12, combiner 14, and booster amplifier 18, one or more of those elements could reside externally to input terminal 11.

System 10 communicates optical signal 16 over an optical communication medium 20. Communication medium 20 can comprise a plurality of spans 20a–20n of fiber, each separated by an optical element. As used in this document, the term "span" refers to an optical medium coupled to one or more optical elements. As particular examples, fiber spans 20 could comprise standard single mode fiber (SMF), dispersion-shifted fiber (DSF), non-zero dispersion-shifted fiber (NZDSF), or other fiber type or combinations of fiber types.

Two or more spans of medium 20 can collectively form an optical link. As used herein, the term "optical link" refers to a plurality of optical spans coupled to one or more optical elements. In the illustrated example, system 10 includes one link 25. System 10 could alternatively include any number of additional links.

In this example, system 10 also includes one or more in-line amplifiers 22a–22m. In-line amplifiers 22 reside between fiber spans 20 and operate to amplify signal 16 as it traverses fiber 20.

In this example, system 10 includes one or more add/drop multiplexers, switches, and/or routers 15 coupled to communication medium 20 and operable to direct signals to and from optical link 25 for combination with signals to and from other optical links. Element 15 may be coupled to an amplifier or may itself be capable of amplifying optical signals received.

System 10 can also include an output terminal 13 operable to receive signals from communication link 20 and to facilitate, for example, conversion of the optical signals to an electrical format. In this example, output terminal 13 includes a preamplifier 24 operable to receive signal 16 from a final fiber span 20n and to amplify signal 16 prior to passing that signal to a separator 26. Separator 26 may comprise, for example, a wavelength division demultiplexer (WDM). Separator 26 operates to separate individual wavelength signals 16a–16n from multiple Wavelength signal 16. Separator 26 can communicate individual signal wavelengths or ranges of wavelengths 16a–16n to a bank of receivers 28 and/or other optical communication paths. Although this example illustrates output terminal 13 as including each of preamplifier 24, separator 26, and receivers 28, one or more of those elements could reside externally to output terminal 13.

Amplifiers within system 10 could each comprise, for example, a rare earth doped amplifier such as an erbium doped or thulium doped amplifier, a Raman amplifier, a semiconductor amplifier, or a hybrid or combination of these or other amplifier types.

At least one optical element in system 10 comprises or communicates with a management system 30 operable to track and/or manage the performance of that element or of the optical link containing that element. Management system 30 operates to store provisioning information describing at least one setting of the element and to store monitored information describing at least one operational characteristic of the element. Management system 30 correlates at least some of the provisioning information with at least some of the monitored information and maintains a correlation history useful in a variety of applications.

Figure 2:
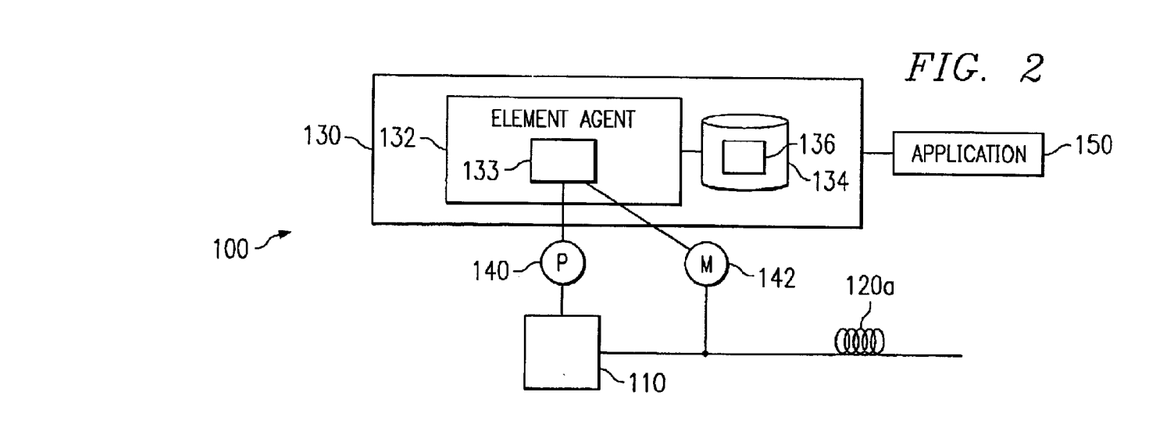
FIG. 2 is a block diagram showing one example of an amplification span constructed according to the teachings of the present invention.

FIG. 2 is a block diagram showing one example of an amplification span 100 including an optical element 110 and an element manager 130 operable to track and/or manage the performance of element 110. In this particular example, element 110 comprises an input terminal including a plurality of optical transmitters and a booster amplifier. Although this example describes implementing cement manager in combination with an input terminal, element manager 130 could alternatively be used to track and/or manage any other type of optical element in system 10, such as an in-line or other type of amplifier, an output terminal, an add/drop multiplexer, a cross connect, or a router, to name a few.

The booster amplifier of element 110 may comprise any type of amplifier including, for example, a rare-earth doped amplifier, a distributed Raman amplifier, a discrete Raman amplifier, a semiconductor amplifier, or a combination of these or other types of amplifiers. Element 110 couples to optical span 120a, which might comprise, for example, a span of standard single mode fiber, dispersion-shifted fiber, non-zero dispersion-shifted fiber, or other fiber type or combinations of fiber types.

Element manager 130 includes an element agent 132 operable to receive provisioning information 140 and monitoring information 142. Provisioning information 140 comprises information describing at least one setting of element 110. For example, provisioning information 140 could comprise information relating to the gain of the preamplifier in element 110, a laser drive current associated with one or more of the transmitters or the preamplifier in element 110, a pre-emphasis level associated with element 110, or a number of channels being processed by element 110, to name a few. Other optical elements may store these or various other items of provisioning information, depending on the particular application of the optical element.

Monitored information 142 comprises information describing at least one operational characteristic of element 110. Monitored information 142 can be obtained at various locations along amplification span 100. For example, monitored information 142 may be collected from an input to element 110 or from an output of element 110. Examples of monitored information 142 include input power, output power, mid-stage power, gain tilt, signal-to-noise ratio, back reflected power, total transmitted power, per channel transmitted power, total received power, or per channel received power, pump laser power, pump laser drive current, thermal electrical cooler settings, thermal electrical cooler drive currents, to name a few. Of course, the particular monitored information collected can vary depending on the function of the element being monitored. Moreover, other or additional operational characteristics could be monitored without departing from the scope of the invention.

In one particular embodiment, element agent 132 operates to query element 110 to obtain provisioning information 140 and/or monitored information 142. Rather than recording provisioning information 140 and/or monitored information 142 only when provisioning characteristics are changed, element agent 132 can periodically, on a random basis, or on command query element 110 to retrieve provisioning information 140 and/or monitored information 142.

Regardless of how or when element agent 132 receives provisioning information 140 and monitored information 142, element agent 132 stores the information received in a memory 134. Memory 134 may comprise, for example, any hardware, firmware, software, or combination thereof operable to store and facilitate retrieval of information. Memory 134 can comprise any of a variety of data structures, arrangements, or compilations operable to store and facilitate retrieval of various information. This may include, for example, the use of a dynamic random access memory (DRAM), a static random access memory (SRAM), or any other suitable volatile or non-volatile storage and retrieval device or a combination of devices. Although, in this embodiment, memory 134 is shown as residing within element manager 130, all or a portion of memory 134 could reside remotely from and accessible to element agent 132.

In the illustrated embodiment, memory 134 includes a correlation history 136. Correlation history 136 may comprise, for example, a memory operable to store provisioning information 140 and monitored information 142, where at least a portion of monitored information 142 is correlated with at least a portion of provisioning information 140. Correlation history 136 can include a plurality of sets of correlated provisioning information 140 and monitored information 142 stored over a period of time of operation of element 110.

Memory 134 is accessible to one or more applications 150 operable to monitor, display, report on, analyze, and/or modify the performance of element 110 based at least in part on information retrieved from memory 134.

In operation, element agent 132 receives provisioning information 140 and monitored information 142 correlated with at least a portion of provisioning information 140. In a particular embodiment, element agent 132 may query element 110 to retrieve this information. Element agent 132 may receive provisioning information 140 and correlated monitored information 142 at various times during operation of element 110.

Element agent 132 stores provisioning information 140 and correlated monitored information 142 in memory 134. In a particular embodiment, element agent 132 stores provisioning information 140 and correlated monitored information 142 associated with a particular time period in a record stored in correlation history 136. Over time, element agent 132 may store a plurality of records containing provisioning information 140 and correlated monitored information 142 associated with particular time periods. In a particular embodiment, these records can collectively form correlation history 136.

One or more applications 150 access information in memory 134 to track and/or manage the performance of element 110. As one particular example, application 150 may comprise a graphical user interface (GUI) operable to display one or more sets of correlated provisioning information 140 and monitored information 142. This may facilitate, for example, inspection of provisioned and operational characteristics of element 110 to identify trends in operation, to identify a malfunctioning component of element 110, to facilitate optimization of operation, or various other utilities.

As another example, application 150 could comprise a benchmarking application operable to facilitate "before and after" comparisons to assess the impact of a change in provisioning to the operation of element 110.

As still another example, application 150 could comprise a trouble shooting application operable to identify improper or inefficient provisioning settings in element 110. For example, trouble shooting application 150 could index correlation history 136 using monitored information representing desired operational characteristics to identify provisioning information previously correlated with those characteristics. This provisioning information could represent a provisioning state known to produce desirable operational characteristics. Application 150 can then compare the retrieved provisioning information 140 with the current element settings to facilitate identification of problems with and/or modification of the provisioning of element 110 so that its operation can more closely approximate the desired state of operation.

As a related example, application 150 could facilitate reversion provisioning. For example, correlation history 136 may store a set of provisioning information 140, which is known based, for example, on past experience to yield desired results. By indexing correlation history 136 using a portion of the provisioning information and one or more desired operational characteristics, the remaining provisioning information associated with the desired operating characteristics can be recalled.

As a particular example, one set of provisioning information 140 and monitored information 142 may identify pump power levels, pre-emphasis levels, and/or amplifier gain levels associated with a particular number of channels and particular operational characteristics. As the number of channels processed by element 110 changes over time, provisioning information 140 associated with the element may also change. When the number of channels returns to its original state, a reversion provisioning application 150 can facilitate automatically reverting to the set of provisioning information previously used by element 110 when dealing with that particular number of channels. This can eliminate guesswork and inefficiency associated with trying to recreate that set of provisioning information based on a trial and error approach. By, for example, searching correlation history 136 for provisioning information 140 containing a desired number of channels, and possibly correlated with a desired output characteristic, reversion provisioning application 150 can apply all or a part of the retrieved provisioning information 140 to revert element 110 to previously approved element settings.

These are just a few examples of advantageous uses of correlation history 136 in system 100. Various other uses of this information fall within the spirit and scope of this invention.

Figure 3:
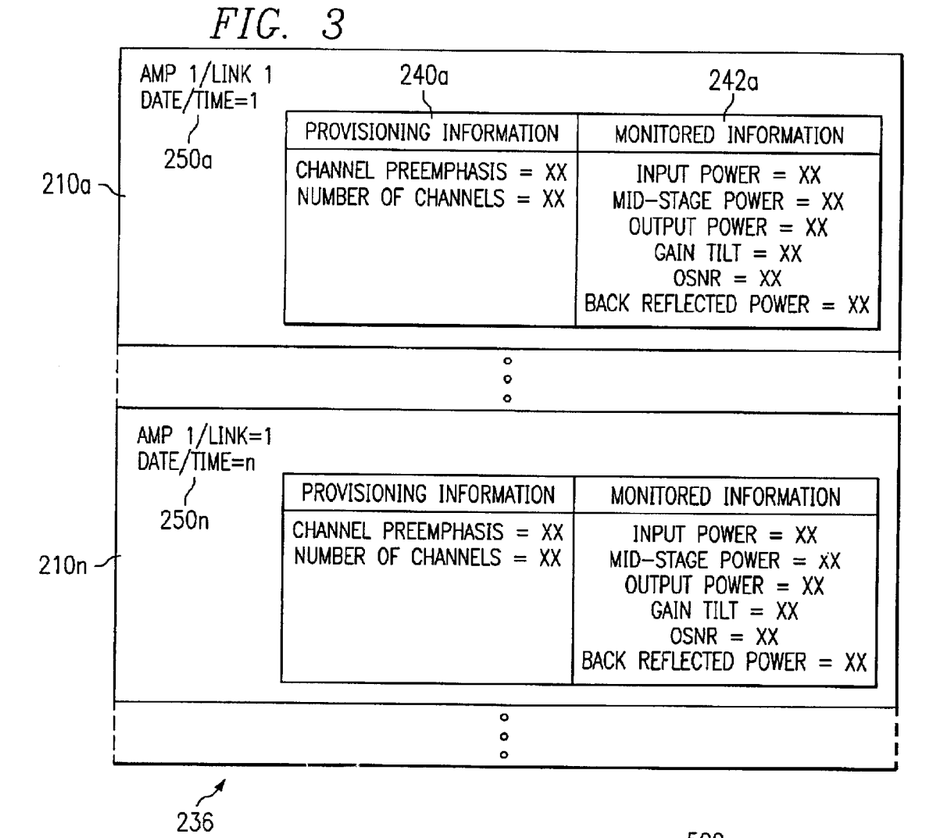
FIG. 3 is a block diagram of one example of a correlation history associated with a particular optical is element constructed according to the teachings of the present invention.

FIG. 3 is a block diagram of one example of a correlation history 236 associated with a particular optical element, for example, optical element 110 described with respect to FIG. 2. In this example, correlation history 236 includes a plurality of records 210a–210n. Each record includes provisioning information 240 and monitored information 242 associated with element 110 at a particular time 250.

Provisioning information 250 may include, for example, information regarding channel pre-emphasis used in element 110 as well as and the number of channels processed by element 110. Other provisioning information could be stored without departing from the scope of the invention. Monitored information 242 could include, for example, input power, mid-stage power, output power, gain tilt, optical-signal-to-noise-ratio, back reflected power, or any other operational characteristics associated with element 110.

In a particular embodiment, any individual piece of provisioning information 240 can be used as an index to retrieve any piece of monitored information 242 residing in the same record. Likewise, items of monitored information 242 can be used as an index to retrieve any item of provisioning information 240 from the same record 210. In addition, any piece of provisioning or monitored information could be used to access all or a portion of any other correlated information. Other arrangements and correlation schemes could be used without departing from the scope of the invention. The above-described correlation is intended as just one example.

Figure 4:
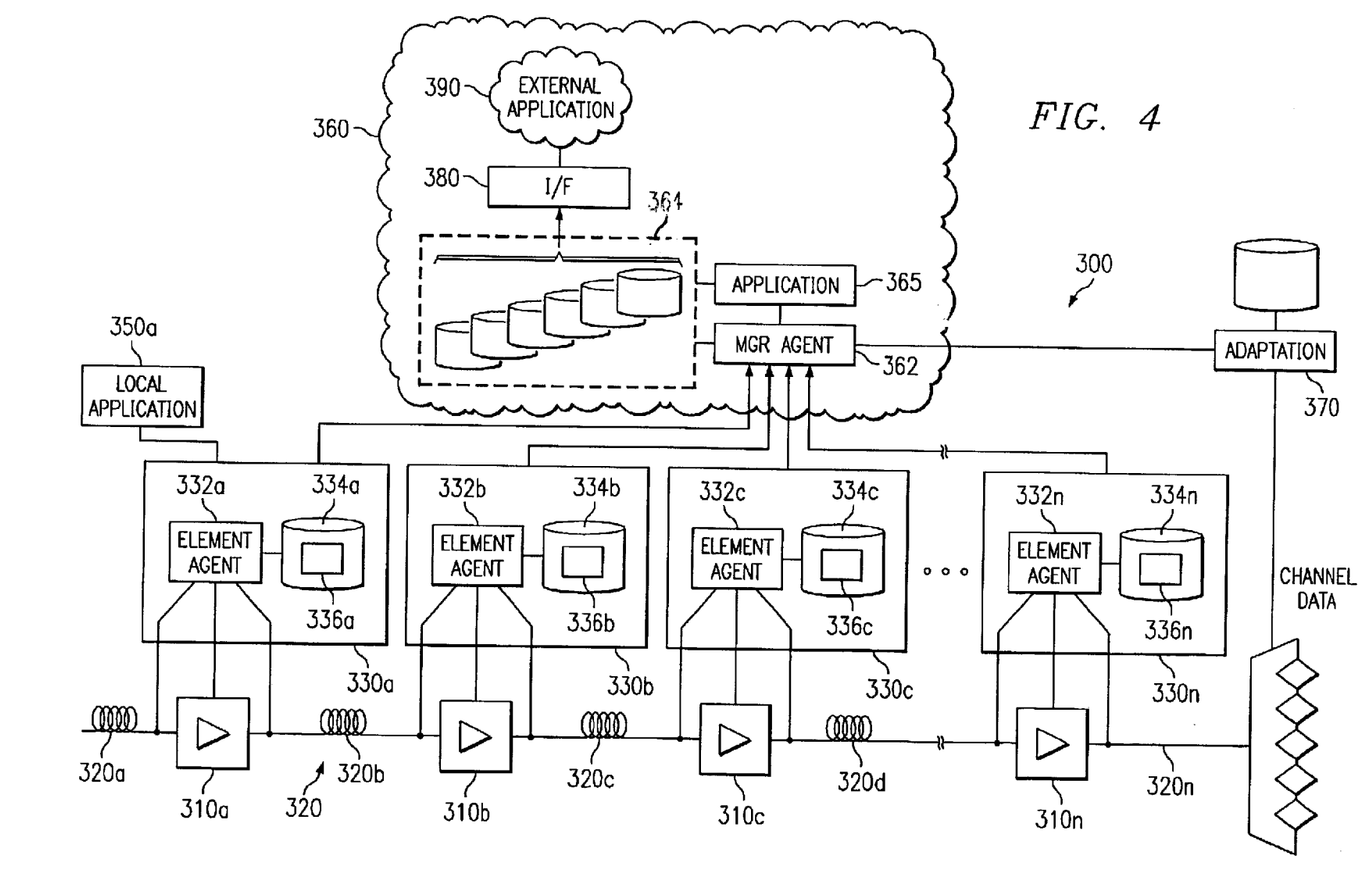
FIG. 4 is a block diagram of a link management system constructed according to the teachings of the present invention.

FIG. 4 is a block diagram of a link management system 300. Link management system 300 includes an optical link 320 comprising a plurality of spans 320a–320n. Each optical span comprises an optical fiber coupled to one or more optical elements 310. Each element in system 300 has associated with it a local element manager 330. Local element managers 330 are similar in structure and function to element manager 130 described with respect to FIG. 2. Each local element manager 330 includes an element agent 332 operable to receive provisioning information 340 and monitored information 342 from its associated element 310. Element agents 332 store provisioning information 340 and monitored information 342 in their associated memories 334.

As in the embodiment shown in FIG. 2, memories 334 may store correlation histories 336, which include provisioning information 340 correlated to monitored information 342. One or more element applications 350 may access memories 334 to track and/or modify performance of individual elements 310 or combinations of elements 310.

In the illustrated embodiment, system 300 includes a link manager 360 operable to track and/or modify performance of one or more elements 310 and/or the entire optical link 320. In this example, link manager 360 includes a manager agent 362 operable to receive provisioning and monitored information from each of elements 310. Manager agent 362 may receive this information, for example, through each element agent 332 querying elements 310, or may obtain information already queried or otherwise received from elements 310 and stored in element memories 334. Link manager 360 also includes one or more memories 364. Memory 364 stores information associated with each element 310 in optical link 320.

Link manager 360 may also receive information from adaptation module 370. Adaptation module 370 comprises hardware, software, and/or firmware operable to facilitate retrieval of provisioning and/or monitored information of various manufacturers' equipment. For example, equipment interfacing with adaptation module 370 may provide provisioning and/or monitored information in a format other than the format typically used by link manager 360. Adaptation module 370 operates to reformat the information received so that it can be assimilated and/or correlated with other information associated with optical link 320.

Link manager 360 may further include one or more applications 365 operable to track and/or manage operation of elements 310 and/or optical link 320 based at least in part on provisioning information and monitored information associated with those elements. Application 365 may obtain such information, for example, from records residing in manager memory 364. Application 365 may provide some or all of the functions of application 150 described with respect to FIG. 2. In addition, application 365 may facilitate tracking and/or managing the operation of optical link 320.

For example, application 365 may facilitate identifying a malfunctioning component in one or more elements 310 by examining the operation of optical link 320. As a particular example, a pump driving one of an element including an amplifier may be weakening. Application 365 may compare various characteristics associated with elements in optical link 320 to identify the weakening amplifier pump. Application 365 may, for example, compare input powers to each amplifier and pump powers driving each amplifier to determine the location of a weakening pump.

In one case, application 365 may determine that a particular element 310b is receiving an appropriate power level input signal, but exhibiting a high drive current to its laser pump. This indicates that the driving source associated with element 310b is likely weakening. In another case, application 365 may determine that although element 310b has an abnormally high pump power, the input signal to element 310b is abnormally law. This could indicate, for example, a malfunction in the previous amplifier 310a in that span, or a fault in optical span 320b between elements 310a and 310b. System 300 facilitates pinpointing the location of a malfunction in an optical link by facilitate simultaneous analysis of characteristics associated with a number of elements 310 along optical link 320.

In this example, link manager 360 includes an interface 380, which facilitates an external application 390 accessing and retrieving information from manager memory 364. External application 390 may comprise a module remote from optical link 320, which is operable to access provisioning and monitored information associated with link 320 and to facilitate tracking and/or management of elements 310 and/or optical link 320. Interface 380 could provide security features to protect correlation histories 364 from unauthorized access by external entities.

In this particular example's operation, link 320 receives optical signals at an element 310a comprising an amplifier, which amplifies the optical signals and communicates them toward the next element 310. Element agents 332 associated with each element 310 may periodically, on a random basis, or on command receive or retrieve provisioning and monitored information from one or more elements 310. Element agents 332 store the provisioning and correlated monitored information in correlation histories 336 of memories 334. Manager agent 362 on demand, on a periodic basis, or on a random basis, accesses and retrieves provisioning and correlated monitored information associated with each element 310 and stores that information in manager memory 364. Manager applications 365 and/or external applications 390 track and/or modify the operation of elements 310 and/or optical links 320 based at least in part on provisioning and monitored information associated with those amplifiers.

Figure 5:
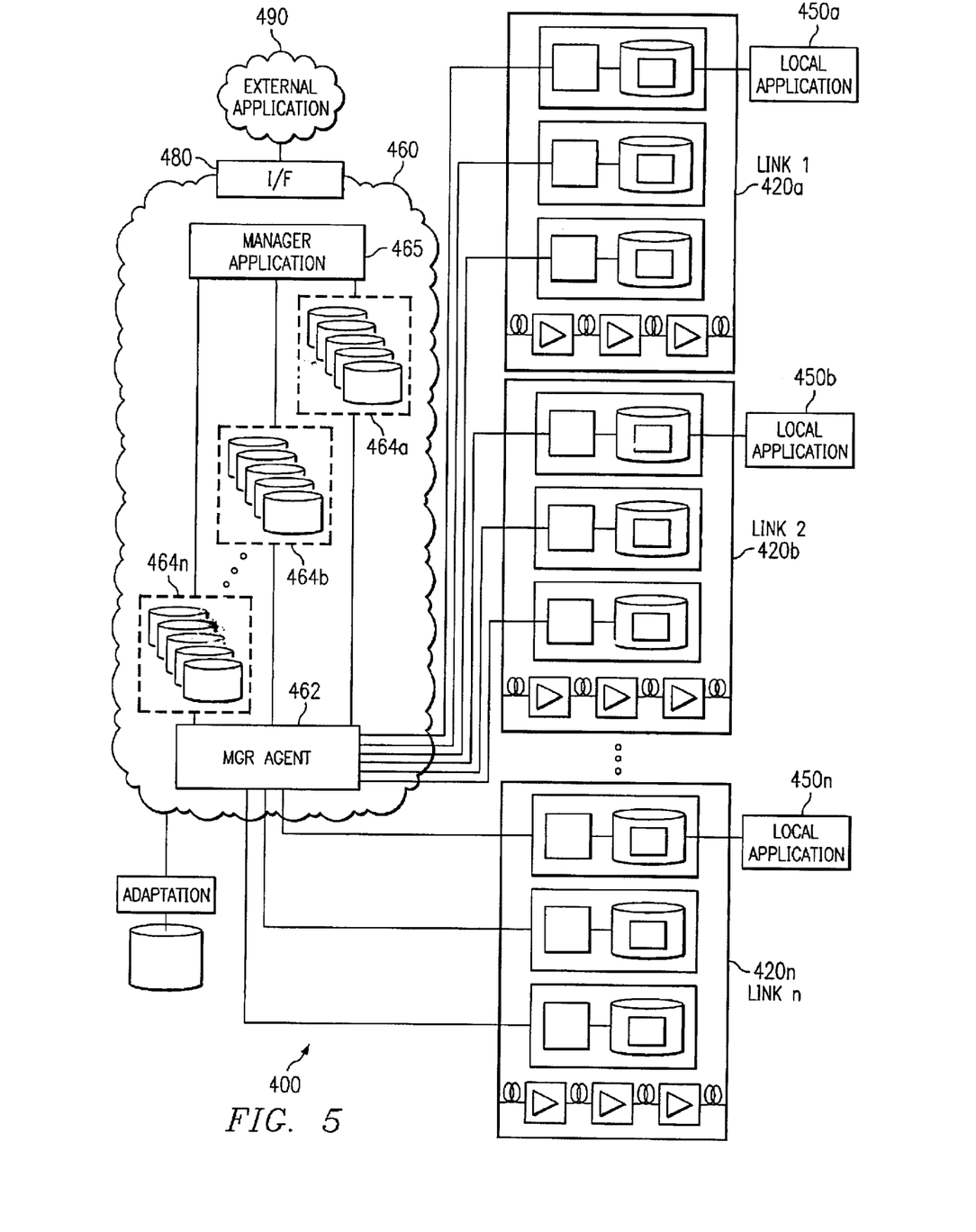
FIG. 5 is a block diagram showing one example of a multiple link management system constructed according to the teachings of the present invention.

FIG. 5 is a block diagram showing one example of a multiple link management system 400. Multiple link management system 400 includes a system manager 460 operable to track and/or manage one or more optical links in system 400. System manager 460 is similar in structure and function to link manager 360 shown in FIG. 4, and has capabilities of managing numerous optical links 420a–420n.

System manager comprises a manager agent 462 operable to receive provisioning and monitored information from numerous elements in one or more optical links 420a–420n. Manager agent 462 can receive this information, for example, through each element agent 432 querying elements 410, or may obtain information already queried or otherwise received from elements 410 and stored in element memories 434. System manager 460 also includes one or more memories 464a–464a. Memories 464a–464a could be physically separate storage devices, or could comprise logically partitioned regions of one or more common memory devices. Each memory 464 stores information associated with each element 410 in its associated optical link 420.

System manager 460 may also receive information from adaptation module 470. Adaptation module 470 comprises hardware, software, and/or firmware operable to facilitate retrieval of provisioning and/or monitored information of various manufacturers' equipment. For example, equipment interfacing with adaptation module 470 may provide provisioning and/or monitored information in a format other than the format typically used by link manager 460. Adaptation module 470 operates to reformat the information received so that it can be assimilated and/or correlated with other information associated with optical link 420.

Link manager 460 may further include one or more element applications 465a–465n operable to track and/or manage operation of elements 410 and/or optical links 420 based at least in part on provisioning information and monitored information associated with those elements and/or links. Applications 465 may provide some or all of the functions of application 150 described with respect to FIG. 2. In addition, application 465 may facilitate tracking and/or managing the operation of optical links 420a–420n individually, or in combination with one another.

Figure 6:
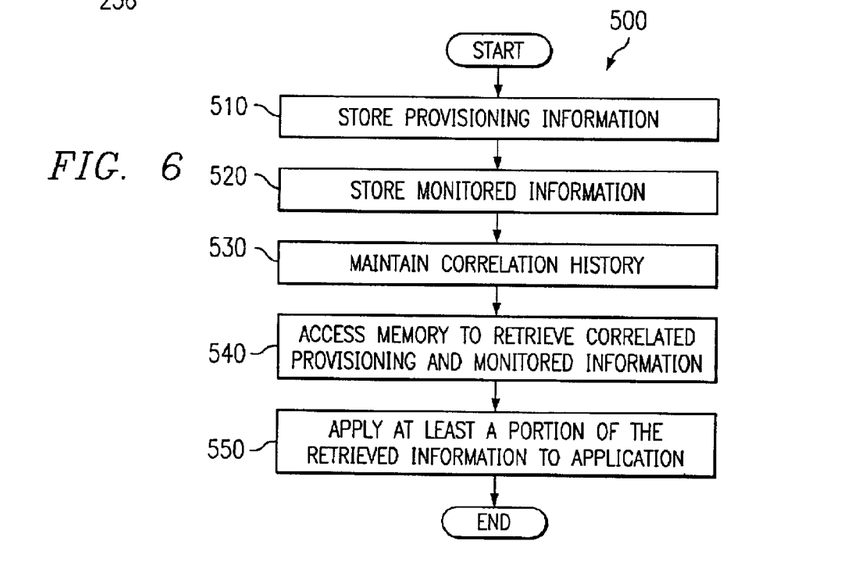
FIG. 6 is a flow chart illustrating one example of a method of managing one or more optical elements according to the teachings of the present invention.

FIG. 6 is a flow chart illustrating one example of a method 500 of managing one or more optical elements. To provide one particular example, method 500 will be described with primarily with respect to management system 100 shown in FIG. 2. Other management systems managing different types of optical elements could implement method 500 without departing from the scope of the invention.

In this example, method 500 begins at step 510 where system 100 stores provisioning information 140 in element memory 134. System 100 can obtain provisioning information 140, for example, by using query module 133 to query element 110 on command, periodically, or on a random basis to obtain provision information 140. In a similar manner, system 100 stores monitored information 142 in memory 134. Element agent 132 could, for example, implement query module 133 to retrieve monitored information 142.

Element agent 132 maintains a correlation history 136 at step 530. Correlation history 136 comprises a plurality of correlated values of provisioning information 140 and monitored information 142. Correlation history 136 provides a historical view of the manner in which monitored information 142 varies as provisioning information 140 changes. In addition, correlation history 136 can show the way monitored information 142 can change over time even though provisioning information 140 remains constant.

In this example, element agent 132 accesses memory 134 at step 540 to retrieve correlated provisioning and monitored information. Element agent 132 applies at least a portion of the retrieved correlated information to application 150 at step 550. As particular non-limiting examples, application 150 can operate to display correlated information to users, or may analyze this information to facilitate modifying the operation of element 110. For example, application 150 may retrieve provisioning information from correlation history 136 by indexing correlation history 136 with a known value of monitored information 142 corresponding to a desired state of operation. Application 150 can then compare the retrieved provisioning information with provisioning information currently associated with element 110 to determine changes that need to be made in the provisioning of element 110 to result in the desired state of operation.

As another example, application 150 could perform reversion provisioning. As one example of reversion provisioning, application 150 could index correlation history 136 using one portion of provisioning information 140 to obtain a full set of provisioning information associated with that portion and possibly also associated with a desired state of operation.

Although this example has been described with respect to managing a single element 110, method 500 can equally apply to management of multiple elements in a single optical link, or to managing multiple optical links. Systems shown in FIGS. 4 and 5 provide two non-limiting examples of systems that could implement method 500.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of managing one or more optical elements, comprising:

storing in a memory, provisioning information describing at least a first setting of an optical element;

storing in the memory, monitored information describing at least a first operational characteristic of the optical element, at least a portion of the monitored information being correlated with at least a portion of the provisioning information; and maintaining in the memory, a correlation history comprising a plurality of entries each correlating a value of the first setting to a value of the first operational characteristic, at least two of the entries reflecting correlated values of the first setting and the first operational characteristic determined at different times.

2. The method of claim 1, wherein the memory comprises a memory local to the optical element.

3. The method of claim 1, wherein the memory comprises a central memory operable to store information relating to a plurality of optical elements.

4. The method of claim 3, wherein the plurality of optical elements reside in a single optical link.

5. The method of claim 3, wherein the plurality of optical elements comprises:
   a first plurality of optical elements residing in a first optical link; and
   a second plurality of optical elements residing in a second optical link.

6. The method of claim 1, wherein the provisioning information comprises an optical element setting selected from a group consisting of an amplifier gain, a laser drive current, a pre-emphasis level, and a number of channels amplified.

7. The method of claim 1, wherein the monitored information comprises information selected from a group consisting of a total received power, a total transmitted power, a per channel received power, a per channel transmitted power, a mid-stage power of a multi-stage amplifier, a pump laser setting, a pump laser output power, a pump laser drive current, a thermal electrical cooler setting, and a thermal electrical cooler drive current, an amplifier output power, a gain tilt, an optical signal-to-noise ratio, and a back reflected power.

8. The method of claim 1, further comprising querying the optical element for provisioning information describing at least one element setting.

9. The method of claim 1, further comprising:
   accessing the memory to retrieve correlated provisioning and monitored information; and
   applying at least a portion of the retrieved information to an application operable to monitor and/or modify the performance of the element based at least in part on the retrieved information.

10. The method of claim 9, wherein the application is operable to display the retrieved correlated provisioning and monitored information.

11. The method of claim 9, wherein the application is operable to identify a trend in the operation of the element.

12. The method of claim 9, wherein the application facilitates comparison of correlated provisioning and monitored information associated with a first time period with correlated provisioning and monitored information associated with a second time period.

13. The method of claim 1, further comprising:
   accessing the memory to retrieve provisioning information correlated with monitored information reflecting a desired operational characteristic of the element;
   applying at least a portion of the retrieved provisioning information to the element to result in the element operating more closely to the desired operational characteristic.

14. The method of claim 1, further comprising:
   accessing the memory to retrieve provisioning information correlated with monitored information reflecting a desired operational characteristic of the element;
   comparing the retrieved provisioning information to current provisioning information to determine a difference in provisioning information.

15. The method of claim 14, further comprising applying at least a portion of the retrieved provisioning information to the element to result in the element operating more closely to the desired operational characteristic.

16. The method of claim 1, wherein the optical element comprises an optical amplifier.

17. The method of claim 1, wherein the optical element comprises an input terminal comprising at least one optical transmitter.

18. The method of claim 1, wherein the optical element comprises an output terminal comprising at least one optical receiver.

19. The method of claim 1, wherein the optical element comprises an add/drop multiplexer.

20. A method of managing a plurality of optical elements, comprising:
   storing in a memory, provisioning information describing at least a first setting of each of a plurality of optical elements in an optical link;
   storing in the memory, monitored information describing at least a first operational characteristic of each of the plurality of optical elements, at least a portion of the monitored information being correlated with at least a portion of the provisioning information associated with that optical element; and
   maintaining in the memory, a link history comprising a plurality of entries each correlating a value of the first setting to a value of the first operational characteristic for each of the plurality of optical elements, at least two of the entries reflecting correlated values of the first setting and the first operational characteristic for each of the plurality of optical elements determined at different times.

21. The method of claim 20, further comprising:
   accessing the memory to retrieve correlated provisioning and monitored information; and
   applying at least a portion of the retrieved information to an application operable to monitor and/or modify the performance of at least one of the plurality of optical elements based at least in part on the retrieved information.

22. The method of claim 21, wherein the application is operable to display the retrieved correlated provisioning and monitored information for each of the plurality of optical elements in the optical link.

23. The method of claim 21, wherein for at least one of the plurality of optical elements, the application facilitates comparison of correlated provisioning and monitored information associated with a first time period with correlated provisioning and monitored information associated with a second time period.

24. The method of claim 20, further comprising:
   accessing the memory to retrieve provisioning information correlated with monitored information reflecting a desired operational characteristic of the link;
   applying at least a portion of the retrieved provisioning information to at least one of the plurality of optical elements to result in the optical link operating more closely to the desired operational characteristic.

25. The method of claim 20, further comprising:
   accessing the memory to retrieve provisioning information correlated with monitored information reflecting a desired operational characteristic of the optical link;
   comparing the retrieved provisioning information to current provisioning information to determine a difference in provisioning information.

26. The method of claim 25, further comprising applying at least a portion of the retrieved provisioning information to at least one of the plurality of optical elements to result in the optical link operating more closely to the desired operational characteristic.

27. The method of claim 20, further comprising:
accessing the memory to retrieve provisioning and/or monitored information associated with at least some of the plurality of optical elements;
comparing the retrieved information associated with the at least some of the plurality of optical elements to identify a problem in the optical link.

28. A method of managing one or more optical elements, comprising:
accessing a memory comprising:
monitored information comprising a plurality of values each describing at least a first operational characteristic of an optical element measured at one of a plurality of different times; and
provisioning information describing at least a first setting of the optical element, the provisioning information correlated with at least some of the monitored information; and
retrieving the provisioning information and the correlated monitored information; and
applying at least a portion of the retrieved provisioning information to the optical element to result in the optical element operating more closely to the desired operational characteristic.

29. The method of claim 28, wherein retrieving the provisioning information comprises:
identifying monitored information associated with the desired operational characteristic; and
identifying the provisioning information correlated to the identified information.

30. The method of claim 28, wherein retrieving the provisioning information comprises identifying provisioning information associated with a desired optical element setting.

31. A method of managing one or more optical elements, comprising:
accessing a memory comprising:
monitored information comprising a plurality of values each describing at least a first operational characteristic of an optical element measured at one of a plurality of different times; and
provisioning information describing at least a first setting of the optical element, the provisioning information correlated with at least some of the monitored information; and
retrieving the provisioning information and the correlated monitored information; and
applying at least a portion of the retrieved information to an application operable to monitor and/or modify the performance of the optical element based at least in part on the retrieved information.

32. The method of claim 31, wherein the application is operable to display the retrieved correlated provisioning and monitored information.

33. The method of claim 31, wherein the application is operable to identify a trend in the operation of the optical element.

34. The method of claim 31, wherein the application facilitates comparison of correlated provisioning and monitored information associated with a first time period with correlated provisioning and monitored information associated with a second time period.

35. A system operable to facilitate management of one or more optical elements, the system comprising:
an element agent operable to receive provisioning information describing at least a first setting of an optical element and monitoring information describing at least a first operational characteristic of the optical element, wherein at least a portion of the provisioning information is correlated with at least a portion of the monitored information; and
an element memory accessible to the element agent and operable to maintain a correlation history for the optical element, the correlation history comprising a plurality of entries each correlating a value of the first setting to a value of the first operational characteristic, at least two of the entries reflecting correlated values of the first setting and the first operational characteristic determined at different times.

36. The system of claim 35, wherein the optical element agent comprises a querying module operable to query the optical element on demand, on a period basis, or on a random basis to retrieve provisioning or monitored information.

37. The system of claim 35, wherein the memory comprises a memory local to the optical element.

38. The system of claim 35, wherein the memory comprises a central memory operable to store information relating to a plurality of optical elements.

39. The system of claim 35, wherein the plurality of optical elements reside in a single optical link.

40. The system of claim 35, wherein the plurality of optical elements comprise:
a first plurality of optical elements residing in a first optical link; and
a second plurality of optical elements residing in a second optical link.

41. The system of claim 35, wherein the provisioning information comprises an element setting selected from a group consisting of an amplifier gain, a laser drive current, a pre-emphasis level, and a number of channels amplified.

42. The system of claim 35, wherein the monitored information comprises information selected from a group consisting of a total received power, a total transmitted power, a per channel received power, a per channel transmitted power, a mid-stage power of a multi-stage amplifier, a pump laser setting, a pump laser output power, a pump laser drive current, a thermal electrical cooler setting, and a thermal electrical cooler drive current, an amplifier output power, a gain tilt, an optical signal-to-noise ratio, and a back reflected power.

43. The system of claim 35, further comprising an application operable to access the correlation history and to monitor and/or modify the performance of the optical element based at least in part on information from the correlation history.

44. The system of claim 43, wherein the application comprises a display module operable to display the retrieved correlated provisioning and monitored information.

45. The system of claim 43, wherein the application comprises a trouble-shooting application operable to identify a problem with a current set of provisioning information by comparing the current set of provisioning information to provisioning information retrieved, from the correlation history.

46. The system of claim 43, wherein the application comprises a reversion provisioning module operable to identify from the correlation history a set of provisioning information previously associated with the optical element and to apply at least a portion of the identified provisioning information to the optical element.

47. The system of claim 43, wherein the application comprises a benchmarking module operable to:
- apply a first set of provisioning information to the optical element to obtain a first set of monitored information correlated to the first set of provisioning information; and
- apply a second set of provisioning information to the optical element to obtain a second set of monitored information correlated to the second set of provisioning information; and
- compare the correlated first set of monitored and provisioning information with the second set of monitored and provisioning information.

48. A system operable to facilitate management of a plurality of optical elements, the system comprising:
- a manager agent operable to receive, for each of a plurality of optical elements, provisioning information describing at least a first setting of the optical element and monitoring information describing at least a first operational characteristic of the optical element, wherein at least a portion of the provisioning information is correlated with at least a portion of the monitored information; and
- a manager memory accessible to the manager agent and operable to maintain a link history for the plurality of optical elements, the link history comprising a plurality of entries each correlating a value of the first setting to a value of the first operational characteristic for each of the plurality of optical elements, at least two of the entries reflecting correlated values of the first setting and the first operational characteristic for each of the plurality of optical elements determined at different times.

49. The system of claim 48, wherein the manager agent comprises a querying module operable to query at least one of the plurality of optical elements on demand, on a period basis, or on a random basis to retrieve provisioning or monitored information.

50. The system of claim 48, further comprising:
- a plurality of element agents, each communicating with one of the plurality of optical elements, each element agent operable to receive provisioning and monitored information from its associated optical element, and each operable to generate an element correlation history associated with that optical element;
- wherein the manager agent is operable to generate the link correlation history based on the element correlation history associated with each of the plurality of optical elements.

51. The system of claim 48, wherein the plurality of optical elements reside in a single optical link.

52. The system of claim 48, wherein the plurality of optical elements comprise:
- a first plurality of optical elements residing in a first optical link; and
- a second plurality of optical elements residing in a second optical link.

53. The system of claim 48, further comprising an application operable to access the link correlation history and to monitor and/or modify the performance of an optical link comprising the plurality of optical elements based at least in part on information from the link correlation history.

54. The system of claim 53, wherein the application comprises a trouble-shooting application operable to identify a problem with a current set of provisioning information by comparing the current set of provisioning information to provisioning information retrieved from the link correlation history.

55. The system of claim 53, wherein the application comprises a reversion provisioning module operable to identify from the link correlation history a set of provisioning information previously associated with at least one of the plurality of optical elements and to apply at least a portion of the identified provisioning information to the at least one optical element.

56. The system of claim 53, wherein the application comprises a benchmarking module operable to:
- apply a first set of provisioning information to the link to obtain a first set of monitored information correlated to the first set of provisioning information; and
- apply a second set of provisioning information to the link to obtain a second set of monitored information correlated to the second set of provisioning information; and
- compare the correlated first set of monitored and provisioning information with the second set of monitored and provisioning information.

* * * * *